Figure 1:
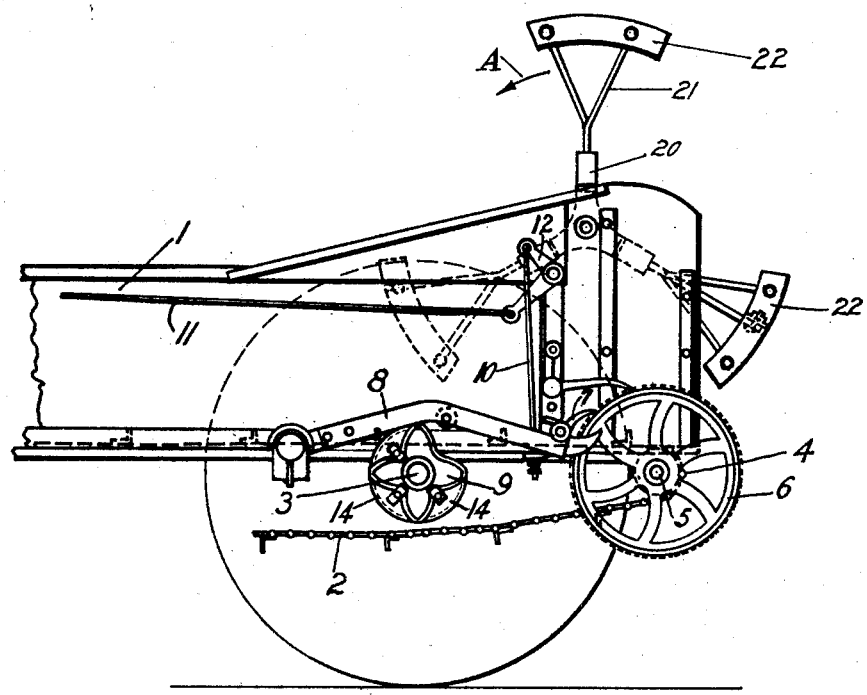

March 6, 1928.

E. C. LITCHFIELD ET AL 1,662,010

CONVERTED MANURE SPREADER

Filed Aug. 18, 1924

2 Sheets-Sheet 1

INVENTORS

March 6, 1928.
E. C. LITCHFIELD ET AL
1,662,010
CONVERTED MANURE SPREADER
Filed Aug. 18, 1924
2 Sheets-Sheet 2
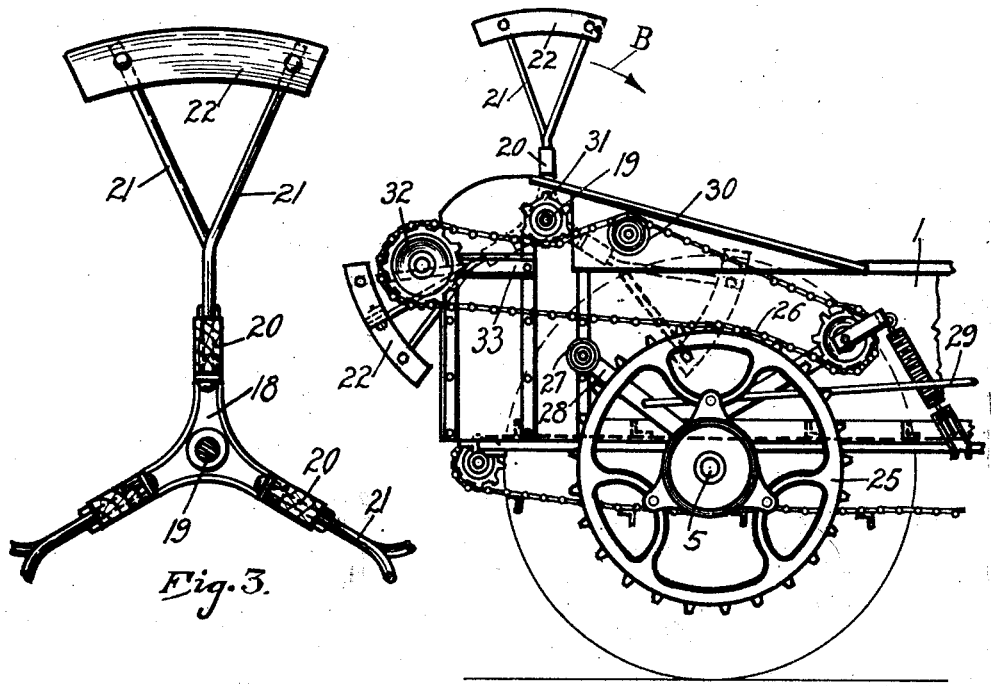
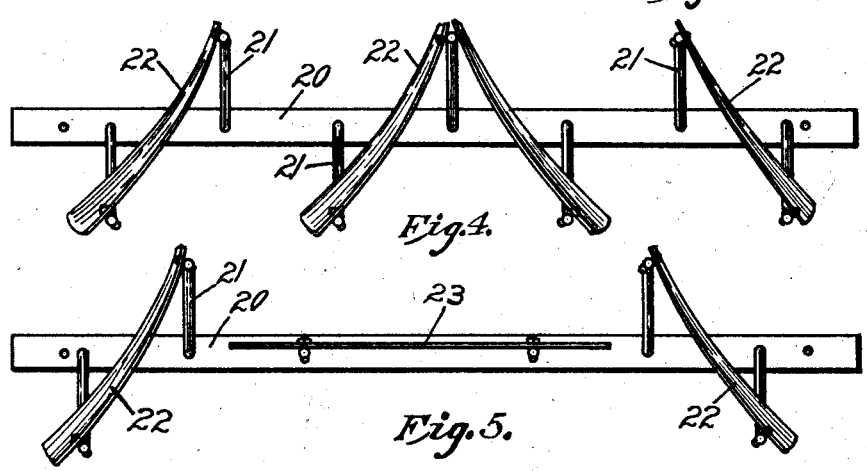
INVENTORS Patented Mar. 6, 1928.

1,662,010

UNITED STATES PATENT OFFICE.

EDGAR C. LITCHFIELD, OF CEDAR FALLS, CLARENCE C. HERMANN, OF WATERLOO, AND VICTOR SPEER, OF CEDAR FALLS, IOWA, ASSIGNORS TO HENRY L. LITCHFIELD, OF WATERLOO, IOWA, AND EDGAR C. LITCHFIELD, OF CEDAR FALLS, IOWA.

CONVERTED MANURE SPREADER.

Application filed August 18, 1924. Serial No. 732,640.

On the great majority of farms it is now customary to apply to the land mineral fertilizers in addition to the ordinary barnyard manure. While manure spreaders have gone into common use, there are a great many farmers who, although they may at times distribute mineral fertilizers, cannot afford to buy machines to distribute the latter.

The object of the present invention is to make it possible for the owner of a manure spreader, at a very small expense, quickly and easily to convert the same into an efficient machine for distributing mineral fertilizer and then to convert the machine again to adapt it to its ordinary use. Or, viewed in another aspect, the present invention may be said to have for its object to produce a simple and novel machine which will cost only slightly more than an ordinary manure spreader, which may quickly and easily be converted from an efficient manure spreader to an efficient distributor for mineral fertilizer, and vice versa.

The various features of novelty whereby our invention is characterized will hereinafter be pointed out with particularity in the claim; but, for a full understanding of our invention and of its various objects and advantages, including those heretofore enumerated, reference may be had to the following detailed description taken in connection with the accompanying drawings wherein:

Figure 1 is a side elevation of the rear end of a well known type of manure spreader, transformed into a spreader for mineral fertilizers, the traction wheel on the near side being omitted; Fig. 2 is a side elevation of the rear end of the spreader shown in Fig. 1, showing the oposite side from that appearing in Fig. 1, the near traction wheel being omitted; Fig. 3 is a transverse section, on an enlarged scale, through the converted upper beater wheel, parts being broken away; Fig. 4 is a plan view of one of the converting bars for the beater wheel; and Fig. 5 is a view similar to Fig. 4, showing a slight modification.

Referring to the drawings, 1 represents the body of a well known type of manure spreader, in the bottom of which is an endless apron or conveyor 2 that feeds the contents of the spreader toward a discharge point which ordinarily is the rear end of the spreader. The moving parts are adapted to be driven from the rear axle 3. The conveyor passes around spocket wheels 4 on a transverse shaft 5 at the rear end of the spreader. On the shaft is a ratchet wheel 6. The ratchet wheel is adapted to be moved step by step by means of a pawl 7 on one end of a long swinging arm or lever 8. The lever is oscillated by means of a cam 9 fixed to the rear axle of the spreader. The cam always swings the actuating lever, during a working stroke, to a fixed upper limit, but the lower limit of movement is determined by a supporting rod 10 manually controlled from the driver's seat through a rod 11 and a bell crank lever 12. By this means the ratchet wheel may be caused to turn through an angle measured by a single tooth or through a larger angle, during each upstroke, depending upon the position of the manual controlling devices; thus varying the speed of travel of the conveyor and the rate at which the contents of the spreader are fed toward the rear. The lowest rate of feed, while suitable for distributing manure, may be much too rapid when mineral fertilizers are being distributed. We have therefore provided a simple means for reducing the number of strokes of the actuating lever during a complete rotation of the actuating cam which is provided with a number of high points each of which normally comes into play during each revolution of the cam. In the arrangement shown, the cam has four projections or high points. We have provided a plurality of filler blocks 14 each of which is adapted to fit into the valley between two high points and present a peripheral working face in the form of an arc of a circle whose radius corresponds to that of these high points on the cam. There should be one less filler block than there are high points, so as to make it possible to convert the cam into a device having only one high point and one low point. These filler blocks may be fastened in place in any suitable way.

It is not sufficient to reduce and control the rate at which the contents of the spreader body are fed to a discharge point, but means must be provided for insuring an even discharge. The spreader that we have illustrated is one having a lower beater wheel at the rear of the spreader body, and an upper beater wheel arranged just within the rear end of the spreader body. In using the machine for distributing mineral fertilizers, the lower beater wheel is removed and the upper beater wheel, provided with suitable scraping blades or sweeps is caused to be driven in the opposite direction from that in which it rotates when distributing manure or the like. The beater wheels are usually made of spiders 18 fixed upon a shaft 19 and carrying a few toothed bars arranged parallel with the shaft. In carrying out our invention we remove these bars and substitute therefor special bars that convert the upper beater wheel into a sweep adapted to operate on the entire advancing face of the oncoming mass of fertilizer, from the top to bottom. In the arrangement shown in Figs. 1–5 these special bars, 20, have long radial arms 21 to the outer ends of which are attached scraping blades 22 of such size and shape, and so located that when the beater wheel is revolved, the outer edges of the blades describe a cylindrical surface approximately continuous from one end of the beater wheel to the other. The parts are so proportioned that the lowermost element of this cylindrical surface is in proximity to the upper surface of the apron or conveyor, so that when the beater wheel is turned in the direction of the arrow A in Fig. 1, or the arrow B in Fig. 2, the blades move down across the advance face of the oncoming mass of fertilizer, scraping a thin layer therefrom and discharging it rearwardly from the spreader. Since the blades travel close to the upper surface of the conveyor, very little fertilizer, if any, will be discharged directly from the conveyor to the ground, but the distribution will be accomplished by the rotating beater wheel or sweeps.

The blades may be disposed in any suitable way, preferably so that their scraping edges have substantial length in the direction of the length of the beater wheel. Thus in the arrangement shown, there are two blades on each bar, each blade being supported between the outer ends of two of the radial arms 21, which arms are spaced apart lengthwise of the bar. Thus the blades are set diagonally of the bars. Furthermore, the blades may be divided into two groups arranged on the two halves of the bar and oppositely disposed. This diagonal arrangement of the blades causes each blade to be brought into contact with the fertilizer in a progressive manner. By having the trailing ends of the two blades nearest the ends of each bar spaced farther apart than are the advance ends, the fertilizer will be spread laterally as it is scraped from the mass in the spreader body and be distributed upon the ground over a width somewhat greater than the width of the body.

In Fig. 5 there is shown an arrangement in which two end blades 22 are arranged diagonally while there is a central blade, 23, that extends parallel with the bar 20. Various other arrangements of blades will naturally suggest themselves and the two specific arrangements are intended simply to be illustrative of the general idea.

The upper beater wheel or sweep is driven by the mechanism normally employed for driving the lower beater wheel. This mechanism is best shown in Fig. 2. Fastened to the traction wheel, on the opposite side of the spreader from that on which the cam is located, is a large sprocket wheel 25. Overlying this sprocket wheel is an endless sprocket chain 26, one run of which normally rests on the sprocket wheel but is adapted to be raised therefrom through the engagement therewith of a roller 27 on one end of a swinging arm 28. A rod 29 extends from this arm into the vicinity of the driver's seat. The upper run of this sprocket chain runs over an idle wheel 30 in front of the shaft 19 for the upper beater wheel. The beater wheel shaft 19 has thereon a small sprocket wheel 31. The sprocket chain 26 normally runs around a sprocket wheel fixed to the shaft of the lower beater wheel; but when the lower beater wheel is removed, the sprocket chain is caused to run around an extra sprocket wheel 32 that is mounted on the spreader body in rear of the sprocket wheel on the upper beater wheel shaft, so that the upper run of the chain, in passing from the wheel 30 to the wheel 32, engages with the underside of the sprocket on the upper beater wheel and therefore causes the latter to run in direction of the arrow B in Fig. 2. The lower beater wheel is usually supported on bars or brackets attached to the lower portions of the sides of the spreader body. When the machine is to be converted into a spreader for mineral fertilizer, these brackets are removed with the lower beater wheel, and one of them 33 is fastened to the spreader body, through bolt holes provided for that purpose, in an elevated position in which it is adapted to support the auxiliary sprocket wheel 32.

It will thus be seen that when the manure spreader is to be transformed into a machine for spreading mineral fertilizer, all that it is necessary for the user to do is to remove the lower beater wheel, attach the auxiliary sprocket 32, and replace the bars of the upper beater wheel by the special bars. Then, if a slower feed of the apron or conveyor than can normally be obtained is desired, one or more filler blocks may be fastened to the cam; whereupon the machine is ready to operate effectively and efficiently to distribute mineral fertilizer. The machine may then be changed back again into a manure spreader with but little effort and in a short time. The attachments, consisting of a few special bars, an additional sprocket wheel, and a few filler blocks, are inexpensive and consequently the purchaser of a manure spreader, by initially going to a slight extra expense, and devoting a little time to changing the machine from one character to another when he desires to transform it, is able to distribute the various kinds of fertilizers conveniently and efficiently without being required to own two separate distributing machines.

While we have illustrated and described with particularity a single preferred form of our invention, with slight modifications, we do not desire to be limited to the exact structural details thus illustrated and described; but intend to cover all forms and arrangement that come within the definitions of our invention constituting the appended claim.

We claim:

The combination with a spreader body having a conveyor for slowly moving the contents toward a discharge point, of a rotatable beater wheel arranged in said body adjacent to said discharge point with its axis of rotation lying in a transverse vertical plane intersecting said conveyor, said beater wheel having scraping blades adapted to pass near said conveyor during the rotation of the beater wheel, and means for rotating the beater wheel in a direction to cause the blades to travel downwardly over the advance face of the approaching mass in the spreader body.

In testimony whereof, we sign this specification.

EDGAR C. LITCHFIELD.
CLARENCE C. HERMANN.
VICTOR SPEER.